United States Patent [19]

Chaudoir

[11] 4,404,898
[45] Sep. 20, 1983

[54] TOASTER WITH PRODUCT WARMER
[75] Inventor: Roderick J. Chaudoir, Fox Point, Wis.
[73] Assignee: Hatco Corporation, Milwaukee, Wis.
[21] Appl. No.: 291,014
[22] Filed: Aug. 7, 1981
[51] Int. Cl.³ .............................................. A47J 27/62
[52] U.S. Cl. ...................... 99/331; 99/339; 99/386; 219/388
[58] Field of Search ............... 99/339, 386, 389, 391, 99/331, 443 C, 483, 390, 392; 219/438, 439, 441, 388, 448, 457, 385, 443, 393, 476, 521; 126/281, 282

[56] References Cited

U.S. PATENT DOCUMENTS

| | | | |
|---|---|---|---|
| 1,581,429 | 4/1926 | Donle | 219/441 |
| 1,776,501 | 9/1930 | Grady | 99/339 |
| 1,817,118 | 8/1931 | Adami | 219/476 |
| 2,027,930 | 1/1936 | Padelford | 99/386 |
| 2,358,996 | 9/1944 | Platkin | 99/339 |
| 2,429,241 | 10/1947 | Schuldiner | 219/476 |
| 2,465,577 | 3/1949 | Cox | 99/339 |
| 2,862,441 | 12/1958 | Schmall | 99/391 |
| 3,191,004 | 6/1965 | Hocker | 219/438 X |
| 3,400,651 | 9/1968 | Hatch . | |
| 3,494,278 | 2/1970 | Chaudoir . | |
| 3,756,141 | 9/1973 | Rose | 99/483 X |
| 3,931,494 | 1/1976 | Fisher et al. | 219/441 |

*Primary Examiner*—Billy J. Wilhite

[57] ABSTRACT

A warming system is described for use with toasters of the type which include an endless coveyor for carrying bread, rolls, muffins or the like past heating devices. Product which has been toasted is deposited into a tray or bin and is maintained in a warm and fresh condition by a pair of heaters. The tray itself is warmed by a heating blanket affixed to at least its bottom surface, while the product is heated from above by a radiant heating element built into the toaster housing and having a reflective shield for focusing the infrared heat generated by the element onto the product. The combination of heating sources maintains the products in a warm condition and maintains the desired freshness by reducing condensation and drying.

10 Claims, 4 Drawing Figures

U.S. Patent  Sep. 20, 1983  Sheet 1 of 2  4,404,898
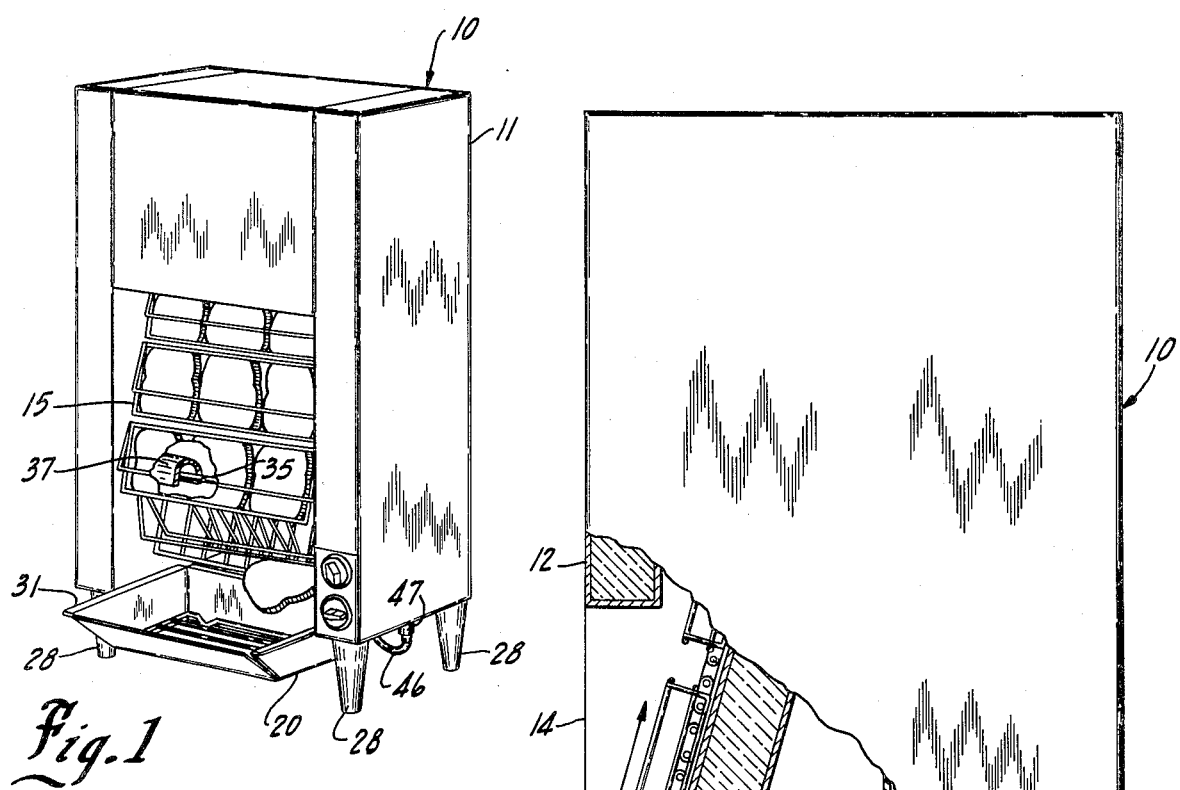
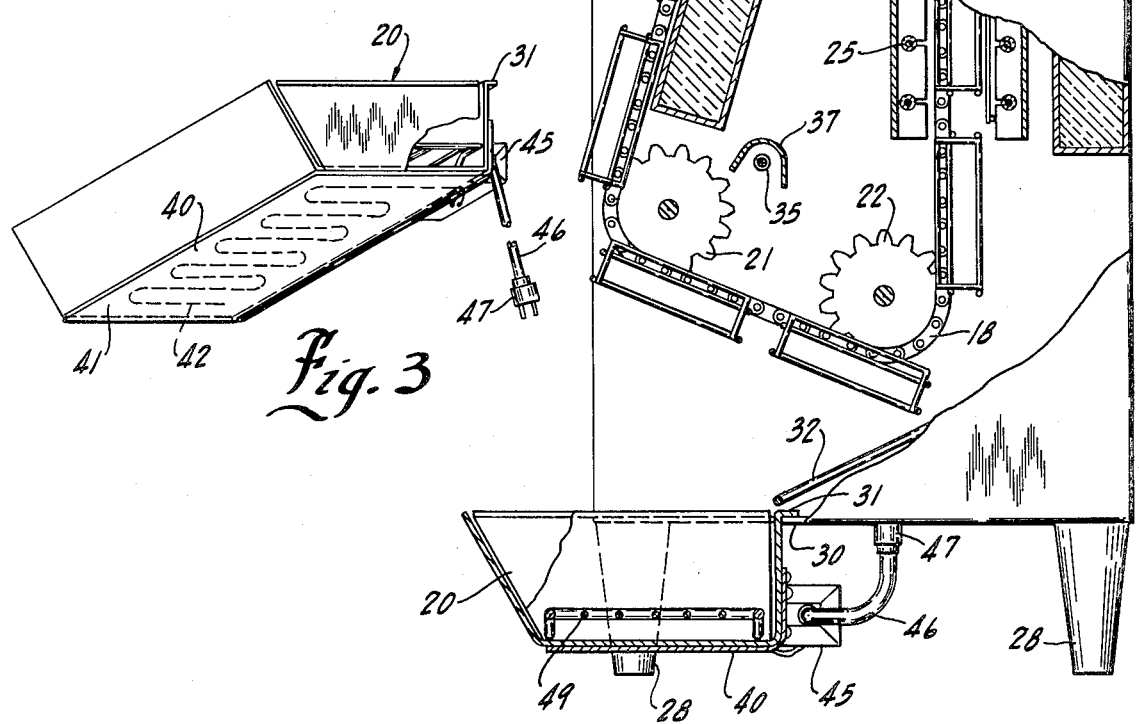

TOASTER WITH PRODUCT WARMER

FIELD OF THE INVENTION

The invention relates generally to the art of toaster devices and more particularly to toaster devices which include a system for maintaining the toasted product in a warm and fresh condition.

BACKGROUND OF THE INVENTION

Conveyorized toaster ovens are known to the art. Toaster devices of the type which the present invention is generally applicable are described in U.S. Pat. No. 3,400,651 issued to Kenneth Gordon Hatch on Sept. 10, 1968 for "Automatic Toaster" and in U.S. Pat. No. 3,494,278, issued on Feb. 10, 1970 to the present inventor for "Automatic Toaster with Replaceable Food-Carrying Baskets." Both patents are assigned to the assignee of the present invention.

The toasters described in the aforementioned patents include a toaster housing and a plurality of radiant heating elements mounted within the housing. An endless conveyor is provided for moving food-carrying baskets adjacent the heating elements to toast food products held within the baskets. An opening is provided in the housing to allow the operator to place the food product in the baskets. The product is toasted as it passes through the housing and is dropped into a product receiving tray at the bottom of the housing.

Control of the toasting process is typically accomplished by varying the speed of the moving conveyor and/or by varying the temperature of or the number of heating elements employed for a particular product. In any event, with toasters of this type, the product must be removed quickly from the product tray because the product will become cold and will lose its warm and fresh taste. In some establishments the product is manually transferred to a separate warmer, because if the toasted product remains in the receiving tray it can become soggy due to impingement of infrared radiation on the top of the product. Such radiant heating has a tendency to drive moisture from the product, which in turn has a tendency to condense on the inside of the receiving tray.

The problem of moisture condensation in food warmers is known. For example, french fry warming devices are known which include a bin for receiving the french fries from a deep fat fryer. An infrared lamp is mounted above the bin with its rays directed onto the product. In early devices of this type, it was noticed that the french fries had a tendency to dry out due to the radiant heating driving moisture away from the product, with condensation occurring in the food bin. In newer french fry warmers, the problem has been overcome by embedding heating elements within the base of the product bin and providing controls to balance the radiant heating of the product and the heating of the bin.

By way of providing further background to the present invention, it should be mentioned that heating blankets consisting of a thin sheet containing embedded heating filaments are well known, and such pads have been employed in the food industry for warming food products. The blankets are applied to shelves, drawers, or other containers and usually include a rheostat device for controlling the amount of heat generated by the blanket. To the knowledge of the present inventor, such blankets have not heretofore been employed with conveyorized toasters of the type described in the above-mentioned Hatch and Chaudoir patents, nor have they been employed in conjunction with a radiant heating element to maintain toasted food products in a warm and fresh condition for an extended period.

OBJECTS OF THE INVENTION

It is a primary object of the present invention to provide a food warming device which employs a combination of heat sources to maintain a toasted product in a warm and fresh condition.

Still another object of the invention is to provide a food warming system for use with conveyorized toasters.

A further object of the present invention is to provide a food warmer for conveyorized toasters which includes a radiant heating element for directing heat onto the upper surface of food products held in a receiving tray and a blanket of heating material affixed to the tray.

A still further object of the present invention is to provide a food warmer in which controls for a radiant heater and a bin heater are provided are maintaining a proper balance of heat from the two heat sources to maximize the product keeping capabilities of the warmer.

How these and other objects of the invention are accomplished will be described in the following specification, taken in conjunction with the FIGURES. Generally, however, the objects are accomplished by providing a food warming system which includes two separate heaters. By reference to conveyorized toasters, the invention may be generally described by stating that toasted food products are deposited by the toaster into a product receiving tray. Mounted above the tray is a radiant heating element which includes a shield for directing heat toward the tray. The heating element includes a control for adjusting the amount of generated heat. The product receiving tray, which typically is constructed from aluminum or stainless steel, includes a blanket of rubberized material, having embedded filaments, on at least its bottom surface. By employing the dual heaters of the present invention, toasted food products can be maintained in a warm and fresh condition without condensation within the tray.

DESCRIPTION OF THE DRAWINGS

FIG. 1 is a perspective view of a toaster according to the present invention, with a portion broken away;

FIG. 2 is a partial vertical side-to-side section through the toaster embodying the invention;

FIG. 3 is a perspective view from beneath the product receiving tray employed with the toaster shown in FIG. 1, with a portion broken away; and, FIG. 4 is a simplified wiring diagram for the toaster of FIG. 1.

DESCRIPTION OF THE PREFERRED EMBODIMENT

Figure 4:
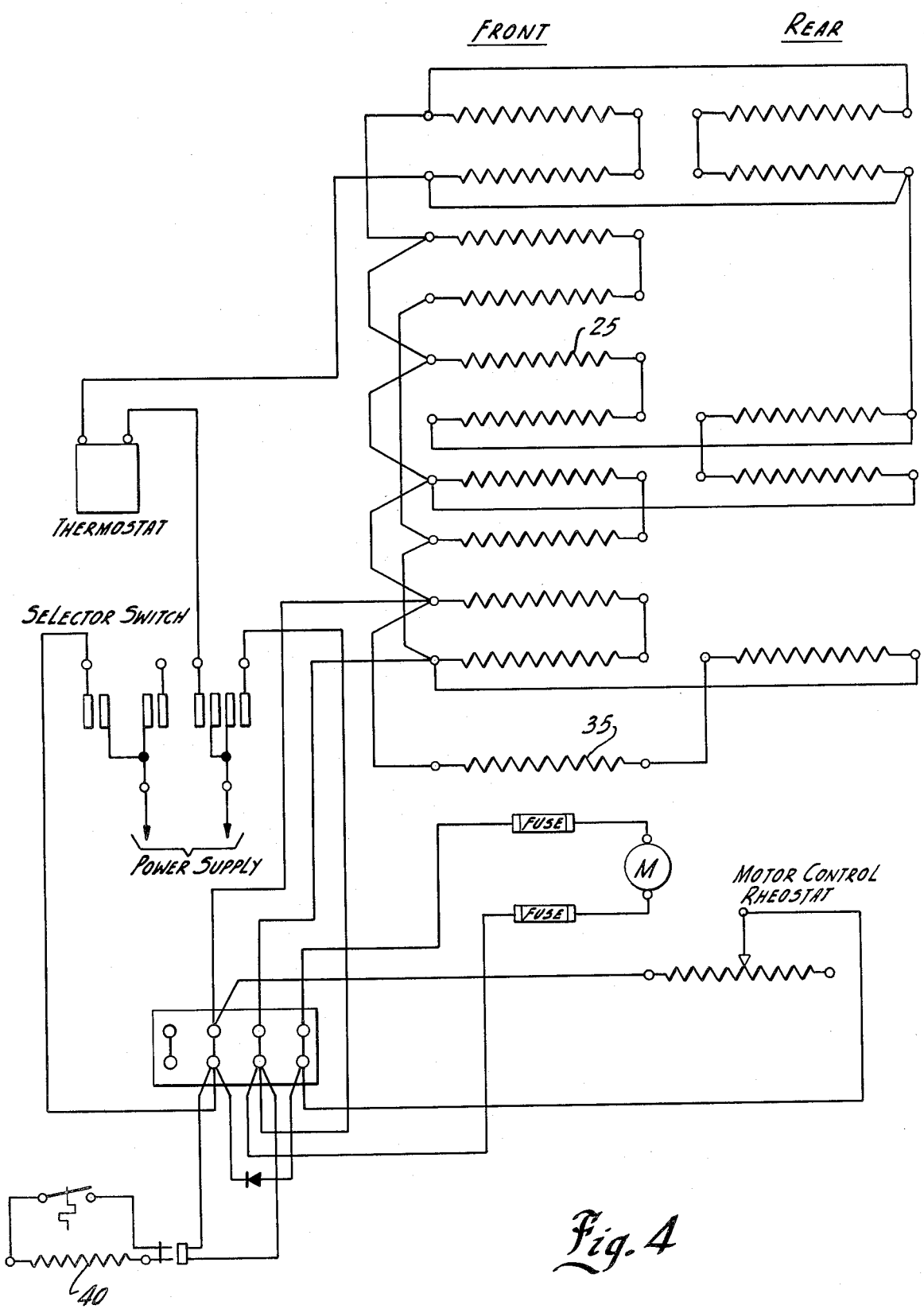

Before proceeding to the description of the preferred embodiment of the present invention, it should be clearly understood that while the principles of the present invention are illustrated in connection with a toaster having a configuration particularly adapted for toasting slices of bread, the present invention has a much wider applicability. Without departing from the teachings of the present invention and by employing minor modifications which would be apparent to one skilled in the art after reading the present specification, the invention could readily be adapted to devices for warming, cooking, or toasting a wide variety of food products and keeping the product in a warm and fresh condition. Without in any way intending to limit the scope of the present invention, the dual heating system described herein may be employed with muffins, rolls, pastry, buns, other bakery products, sandwiches, etc.

The preferred embodiment of the present invention will now be illustrated by a description of FIGS. 1-4. Some details of the conveyorized toaster will not be provided because, with the exception of the dual product warming systems, the toaster is similar in many other ways to the toasters described in the aforementioned Chaudoir and Hatch patents. If further detailed description of the toaster itself is required, reference may be had to those two patents, the disclosures of which are expressly incorporated herein by this reference.

The toaster 10 includes a cabinet 11 which has an insulating front wall 12 with an opening 14 through which food products may be inserted into the several baskets 15. The baskets 15 are coupled to a pair of endless chains 18 which convey the baskets into the toasting zone of the toaster 10. It should also be understood that the side, back, and top of cabinet 11 are insulated to prevent heat loss.

Baskets 15 are constructed from an open wire framework to permit radiant energy to toast the product carried therein and are designed for retaining the object in place as it is being heated and for depositing same in a product receiving tray 20 when the product has completed its travel through the heating zone. Sprockets 21 and 22, as well as an upper sprocket (not shown), are provided for supporting chains 18, with the drive for the conveyors being provided by a motor and shaft (not shown) coupled to drive sprocket 22. Clutch and gear assemblies (not shown) may also be provided for driving the conveyor in a clockwise direction as shown in FIG. 2.

The heating zone within cabinet 11 is defined by parallel rows of heating elements 25. Elements 25 may be either gas or electric, but are preferably of the resistance bar type. Some of the elements 25 may be operated continuously, while others may be operated only when a higher heating capacity is desired. An entire bank of elements (or most elements of such bank) may be cut out if the product is to be toasted on one side only.

While the temperature of the heating elements (or the number employed) may be used to control the degree of heating, it may also be advantageous to vary the rate of movement of the food product through the toasting zone. As described and illustrated in the above-mentioned Hatch patent, this may be accomplished by a rheostat to control the speed of the conveyor driving motor. As also explained in the Hatch patent, the toaster may be provided with means for advancing the product into the heating zone more rapidly than would normally occur relying on conveyor operation, for example if the machine is empty and a slice of bread is added through opening 14. Such movement of the conveyor may be accommodated by an overriding clutch (not shown) between the drive shaft and the drive sprocket 22.

Proceeding now to a description of the novel features of the present invention, cabinet 11 is supported on four legs 28 to provide clearance for the receiving tray 20. In practice, the legs may be about four inches long. In addition to providing clearance for the tray, the elevation of the cabinet facilitates cleaning under toaster 10.

Tray 20 is constructed and arranged for being suitably received and supported on a cut-out at the bottom of cabinet 11, the opening being defined by a flange 30. To this end, the upper surface of the side and back walls of tray 20 include a lip 31 adapted to slide over and rest upon flange 30. In the illustrated embodiment, tray 20 includes a horizontal bottom with perpendicular side and back walls and a front wall which extends outwardly from the bottom. As shown in FIG. 2, tray 20 extends beyond the front of cabinet 11 to allow access by the machine operator to the toasted product, and a slanted wall 32 is provided within the cabinet to insure that the product will fall or slide directly into tray 20.

The two component heating system of the present invention will now be described. The first component is a bar heating element 35 mounted between the sides of cabinet 11 and arranged generally perpendicular thereto. Element 35, in the illustrated embodiment, is located within the area defined by chains 18 and above and centrally of sprocket 21. A generally U-shaped reflector 37 is mounted around element 35 with the open portion of the U directed toward the holding tray 20. The shield reflects radiation generated by element 35, through the wire baskets 15 onto the upper surface of product held in tray 20.

The second component of the heating system of the present invention is a heating blanket 40, which as is shown in FIGS. 2 and 3, is affixed to the bottom and back side of tray 20. While a variety of heating blankets may be employed, the preferred and illustrated blanket is a thin sheet of rubberized material 41 having filaments 42 embedded therein, the filaments being coupled to a thermostat 45 which in turn is coupled through a cord 46 and plug 47 to the electrical wiring system of toaster 10. In the preferred embodiment, blanket 40 is a 150 watt heating blanket which is affixed to the tray 20 with an adhesive cement.

As also will be appreciated from FIGS. 2-3, the blanket extends part way up the back wall to provide heat on that surface, but in some applications, it may be sufficient to have the blanket only on the bottom of tray 20, or it may be desirable to extend blanket 40 to lip 31. The selection of how much of tray 20 to cover with blanket 40 will in some measure depend on the particular characteristic of the food product being toasted with toaster 10.

FIGS. 2 and 3 also show that a trivet 49 may be used in the bottom of tray 20 to keep the toasted product from directly contacting the bottom of tray 20.

In operation, toaster 10 performs its basic toasting function as is known to the art. As product is dropped from the baskets 15 into bin 20 radiant heating from element 35 warms the upper surface of the product while the tray itself is warmed from beneath by blanket 40. An equilibrium condition is established by proper selection of upper and lower heat, creating a desirable warm and humid atmosphere surrounding the food.

FIG. 4 is a simplified wiring diagram for toaster 12. In the preferred embodiment front elements 25 and element 35 comprise 330 W heaters, while the rear elements 25 comprise 250 W heater elements.

While the present invention has been described in connection with a single preferred embodiment, the invention is not to be limited thereby, but is to be limited solely by the claims which follow.

I claim:

1. A food cooking and warming system comprising means for cooking a food product and a food product receiving tray associated therewith and adapted to receive food from said cooking means, means for warming the food received in said tray consisting of an electrical heating element means located above said tray and arranged for directing radiant heat onto said tray and a heating blanket means affixed to the exterior of said tray and adapted for warming said tray.

2. The invention set forth in claim 1 wherein said heating element means comprises a resistance bar electrical heating element and wherein said system further comprises shield means about said heating element for focusing radiation onto said tray.

3. The invention set forth in claim 1 wherein said heating blanket means comprises a sheet of rubberized material having heating filaments embedded therein.

4. The invention set forth in claim 3 wherein said tray comprises a bottom and side walls joined thereto and wherein said heating blanket means is affixed to said bottom and at least one side wall of said tray.

5. The invention set forth in claims 1, 2, 3 or 4 wherein said system further comprises temperature control means for said heating element means and said heating blanket means.

6. In a conveyorized toasting device which includes an insulated cabinet and a product receiving tray, an endless conveyor mounted within said cabinet, food carrying basket means coupled to said endless conveyor, heaters within said cabinet for toasting food products carried within said basket means, said basket means being arranged for carrying food products adjacent said heating means and depositing same into said product receiving tray, the improvement comprising:

providing a food warming system for product held in said receiving tray, said system comprising an electrical heating element means located within said cabinet and above said tray and arranged for directing radiant heat onto said tray and a heating blanket means affixed to the exterior of said tray and adapted for warming said tray.

7. The invention set forth in claim 6 wherein said heating element means comprises a resistance bar electrical heating element and wherein said system further comprises shield means about said heating element for focusing radiation onto said tray.

8. The invention set forth in claim 6 wherein said heating blanket means comprises a sheet of rubberized material having heating filaments embedded therein.

9. The invention set forth in claim 8 wherein said tray comprises a bottom and side walls joined thereto and wherein said heating blanket means is affixed to said bottom and at least one side wall of said tray.

10. The invention set forth in claims 6, 7, 8 or 9 wherein said system further comprises temperature control means for said heating element means and said heating blanket means.

* * * * *